(12) United States Patent
Suzuki

(10) Patent No.: US 10,824,460 B2
(45) Date of Patent: Nov. 3, 2020

(54) INFORMATION PROCESSING APPARATUS, INFORMATION PROCESSING METHOD FOR REDUCING NETWORK TRAFFIC, AND STORAGE MEDIUM

(71) Applicant: FUJITSU LIMITED, Kawasaki-shi, Kanagawa (JP)

(72) Inventor: Kosuke Suzuki, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 16/197,426

(22) Filed: Nov. 21, 2018

(65) Prior Publication Data
US 2019/0205151 A1    Jul. 4, 2019

(30) Foreign Application Priority Data

Dec. 28, 2017   (JP) ................. 2017-253160

(51) Int. Cl.
*G06F 15/16*    (2006.01)
*G06F 9/455*    (2018.01)
*G06F 3/06*    (2006.01)

(52) U.S. Cl.
CPC ........ *G06F 9/45558* (2013.01); *G06F 3/0604* (2013.01); *G06F 3/067* (2013.01); *G06F 3/0631* (2013.01); *G06F 2009/4557* (2013.01); *G06F 2009/45579* (2013.01); *G06F 2009/45595* (2013.01)

(58) Field of Classification Search
CPC .... G06F 9/45558; G06F 3/067; G06F 3/0604; G06F 2009/45595; G06F 2009/4557
See application file for complete search history.

(56) References Cited

U.S. PATENT DOCUMENTS

| | | | |
|---|---|---|---|
| 9,178,698 B1* | 11/2015 | Jarjur | G06F 21/53 |
| 9,201,887 B1* | 12/2015 | Earl | G06F 16/128 |
| 9,342,253 B1* | 5/2016 | Muthukkaruppan | G06F 3/0641 |
| 9,823,872 B2* | 11/2017 | Danilak | G06F 16/2272 |
| 9,886,215 B1* | 2/2018 | Ramachandran | G06F 3/067 |
| 9,946,569 B1* | 4/2018 | Beedu | G06F 9/45558 |
| 10,235,066 B1* | 3/2019 | Chen | G06F 3/0619 |
| 2006/0136667 A1* | 6/2006 | Shultz | G06F 9/5077 711/118 |
| 2008/0134176 A1* | 6/2008 | Fitzgerald | G06F 11/0751 718/1 |

(Continued)

FOREIGN PATENT DOCUMENTS

| | | |
|---|---|---|
| JP | 2009-295127 | 12/2009 |
| JP | 2016-212904 | 12/2016 |
| WO | 2017/072933 | 5/2017 |

*Primary Examiner* — Hieu T Hoang
(74) *Attorney, Agent, or Firm* — Fujitsu Patent Center

(57) ABSTRACT

An information processing apparatus configured to be coupled via a communication line to a plurality of nodes each having a storage device, the information processing apparatus includes a memory; and a processor coupled to the memory and configured to determine, from among a plurality of nodes, a location where a virtual machine is to be placed, determine that a location where management information on data to be processed, the data to be accessed from the virtual machine, is to be stored is, among the plurality of nodes, a node that is identical to the location of the virtual machine, and store the management information in the determined node.

11 Claims, 17 Drawing Sheets

(56) References Cited

U.S. PATENT DOCUMENTS

| | | | |
|---|---|---|---|
| 2009/0089860 A1* | 4/2009 | Forrester | H04L 9/3236 726/3 |
| 2010/0122248 A1* | 5/2010 | Robinson | G06F 9/5077 718/1 |
| 2011/0258297 A1* | 10/2011 | Nightingale | G06F 11/1662 709/220 |
| 2012/0317084 A1* | 12/2012 | Liu | G06F 3/0641 707/692 |
| 2013/0054932 A1* | 2/2013 | Acharya | G06F 3/067 711/202 |
| 2013/0262390 A1* | 10/2013 | Kumarasamy | H04L 67/2804 707/649 |
| 2014/0089318 A1* | 3/2014 | Liu | G06F 16/9017 707/741 |
| 2014/0156960 A1* | 6/2014 | Simoncelli | G06F 21/6218 711/163 |
| 2016/0034356 A1* | 2/2016 | Aron | G06F 11/1435 707/649 |
| 2016/0055026 A1* | 2/2016 | Fitzgerald | H04L 63/145 718/1 |
| 2017/0212919 A1* | 7/2017 | Li | G06F 13/4068 |
| 2018/0189109 A1 | 7/2018 | Nagai et al. | |
| 2019/0075084 A1* | 3/2019 | Ding | H04L 63/104 |

\* cited by examiner

INFORMATION PROCESSING APPARATUS, INFORMATION PROCESSING METHOD FOR REDUCING NETWORK TRAFFIC, AND STORAGE MEDIUM

CROSS-REFERENCE TO RELATED APPLICATION

This application is based upon and claims the benefit of priority of the prior Japanese Patent Application No. 2017-253160, filed on Dec. 28, 2017, the entire contents of which are incorporated herein by reference.

FIELD

The embodiments discussed herein are related to an information processing apparatus, an information processing method, and a storage medium.

BACKGROUND

Recently, running both virtual machines (VMs) or containers and storages on the same distributed system by using a virtualization infrastructure technology called a hyper-converged infrastructure (HCI) has been typically performed.

FIG. 16 is a diagram schematically illustrating a configuration of an existing HCI system.

An HCI system 500 illustrated in FIG. 16 includes three computer nodes 501. Hereinafter, the computer node 501 will be simply referred to as a node 501.

Each node 501 is a computer including a central processing unit (CPU) and a memory, which are not illustrated. Each node 501 implements various functions by running an operating system (OS) and various programs.

For example, each node 501 implements a virtual machine (VM) 505 by executing a hypervisor 502.

The VM 505 is a virtual computer created on the hypervisor 502. Each VM 505, like a computer implemented by physical hardware, uses a basic input/output system (BIOS), a CPU, a memory, a disk, and peripheral devices such as a keyboard, a mouse, and a compact disk read-only memory (CD-ROM) drive and performs various processes. For example, the VM 505 runs various OSs (guest OSs) or runs application programs in the guest OSs.

The hypervisor 502 is a control program for implementing the VM 505. The hypervisor 502, for example, creates and activates one or more VMs 505 on the node 501 on which the hypervisor 502 itself runs.

Furthermore, the node 501 implements functions of a storage controller 503 and a metadata distributed database (DB) 504.

The storage controller 503 manages storage devices 506 respectively included in the nodes 501 of the HCI system 500. For example, the storage controller 503 uses the storage area of each of a plurality of storage devices 506 included in each node 501 of the HCI system 500 to compose one logical volume.

Data, for example, created by the VM 505 is stored in the storage device 506 in any node 501 by the storage controller 503. Hereinafter, data that is created by the VM 505 and is stored in the storage device 506 of any node 501 may be referred to as data to be processed. Metadata for the data to be processed is managed by the metadata distributed DB 504.

The metadata is management information on data to be processed. The metadata includes, for example, information on a location for storage (a location for physical storage) of data to be processed, whether data is compressed, whether deduplication is used, and the like.

The metadata distributed DB 504 manages metadata. The metadata distributed DB 504 arbitrarily determines a location for storage of metadata (a location where metadata is to be saved) in the HCI system 500. The metadata distributed DB 504 sends metadata to the node 501 determined as the location for storage of metadata and causes the node 501 to store therein the metadata.

At the time of access from the VM 505 to data to be processed, the VM 505 passes the logical unit number (LUN) and the logical block addressing (LBA) of the data to be processed to the metadata distributed DB 504. The metadata distributed DB 504 uses the LUN and the LBA to identify the node 501 where metadata is stored. Then, the metadata distributed DB 504 acquires the metadata via a network from the node 501 where the metadata is saved.

The storage controller 503 acquires the location for storage of data to be processed from the metadata. The storage controller 503 then uses information of the acquired location for storage to access the data to be processed. As related art, for example, Japanese Laid-open Patent Publication No. 2009-295127, International Publication Pamphlet No. WO 2017/072933, Japanese Laid-open Patent Publication No. 2016-212904, and so on are disclosed.

However, in the existing HCI system 500 in such a configuration, the VMs 505 read metadata and therefore network access occurs, which results in network traffic. This network traffic is problematic.

FIG. 17 is a diagram illustrating a state (throughput in megabytes per second (MB/s)) of network traffic in the existing HCI system 500.

In the example illustrated in FIG. 17, network traffic resulting from access for reading data to be processed (4K Read) (refer to reference "L1"), network traffic resulting from access for writing metadata (Meta Data Write) (refer to reference "L2"), and network traffic resulting from access for reading metadata (Meta Data Read) (refer to reference "L3") are each represented.

The network traffic resulting from data reading is able to be reduced (refer to reference "L1") by locating data to be processed, which is a read target from the VM 505, in the same node (local node) 501 as the node 501 on which the VM 505 functions.

In contrast, network traffic due to data access that occurs for reading metadata is in a relatively high state (refer to reference "L3").

Metadata in storage is managed by the metadata distributed DB 504, and, in the case where metadata is saved on the node 501 different from the node 501 of the VM 505, network access for reading metadata occurs each time input or output (I/O) to or from data to be processed occurs.

For example, in order to read metadata, a large volume of network traffic for accessing to another node 501 via a network occurs. This increases network traffic, leading to a waste of network resources or the occurrence of latency, which causes a decrease in I/O access performance. While it is desired that network traffic incurred for data reading be reduced, it is not desirable that network traffic for reading metadata increase. In view of the above, it is desirable that network traffic incurred for accessing management information be reduced.

SUMMARY

According to an aspect of the embodiments, an information processing apparatus configured to be coupled via a communication line to a plurality of nodes each having a storage device, the information processing apparatus includes a memory; and a processor coupled to the memory and configured to determine, from among a plurality of nodes, a location where a virtual machine is to be placed, determine that a location where management information on data to be processed, the data to be accessed from the virtual machine, is to be stored is, among the plurality of nodes, a node that is identical to the location of the virtual machine, and store the management information in the determined node.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
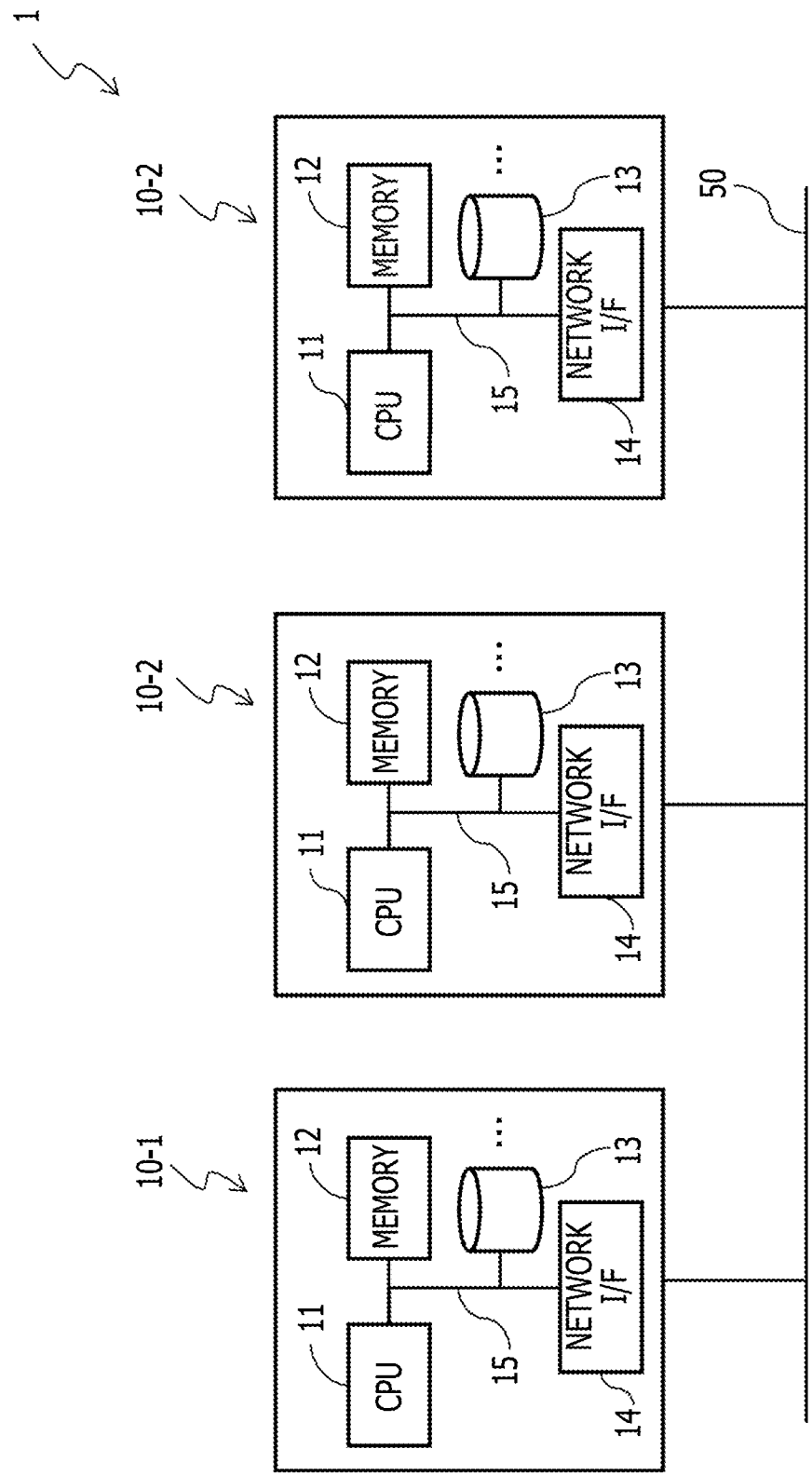
FIG. 1 is a diagram illustrating an example of a hardware configuration of a storage system, according to an embodiment.

Hereinafter, an embodiment according to an information processing apparatus, a control program, and an information processing method will be described with reference to the accompanying drawings. The embodiment described below is merely exemplary and is in no way intended to exclude various modifications and technical applications that are not explicitly described in the embodiment. That is, the present embodiment may be modified in various forms (such as a combination of the embodiment and each modification) without departing from the scope and spirit thereof. Each drawing is not intended to include only components illustrated in the drawing but may include other functions or the like.

(A) Configuration

FIG. 1 is a diagram illustrating an example of a hardware configuration of a storage system 1, according to an embodiment.

The storage system 1 illustrated in FIG. 1 is an HCI system (virtualization infrastructure storage system) including a plurality of (three in the example illustrated in FIG. 1) computer nodes 10-1, 10-2, and 10-3.

The computer nodes 10-1, 10-2, and 10-3 are communicably coupled to each other via a network 50.

The computer nodes 10-1, 10-2, and 10-3 have configurations similar to each other. Hereinafter, as a reference numeral denoting a computer node, reference numeral "10-1", "10-2", or "10-3" will be used when it is desired that one out of the plurality of computer nodes be identified. However, reference numeral "10" will be used when any of the computer nodes is referred to. Hereinafter, the computer node 10 may be simply referred to as a node 10. The node 10 may be referred to as a machine 10.

Each node 10 has its own unique machine ID. In the computer system 1 illustrated in FIG. 1, the machine IDs of three nodes 10-1, 10-2, and 10-3 are "0", "1", and "2", respectively.

Each node 10 is, for example, a computer having server capabilities. Each node 10 includes, as components, a CPU 11, a memory 12, a storage device or storage devices 13, and a network interface (I/F) 14. The components 11, 12, 13, and 14 are configured to be coupled communicably to each other via a bus 15.

Each node 10 provides a storage area of the storage device 13 as a storage resource to a storage controller 110 described hereinafter.

The storage device 13 is a storage device, for example, such as a hard disk drive (HDD), a solid state drive (SSD), or a storage class memory (SCM), in which various types of data are stored. In each node 10, one or more storage devices 13 are included.

In a plurality of storage devices 13 included in each node 10, data (data to be processed) that is to be processed by a VM 2 (refer to FIG. 3) described hereinafter and metadata (management data) for managing the data to be processed are stored.

The storage device 13 where metadata is to be saved is determined by a metadata management unit 111 (refer to FIG. 2) of a storage controller 110 described hereinafter.

The network I/F 14 is a communication interface communicably coupled to another node 10, and is, for example, a local area network (LAN) interface or a fibre channel (FC) interface.

The memory 12 is a storage memory including a read-only memory (ROM) and a random access memory (RAM). In the ROM of the memory 12, an OS, a software program regarding control of a storage system, and data and the like for this program are written. Software programs in the memory 12 are appropriately read and executed by the CPU 1. The RAM of the memory 12 is used as a temporary storage memory or a working memory.

A given area of the RAM of the memory 12 is used as a hash function storage unit 141. In the hash function storage unit 141, two hash functions (arithmetic expressions) H1 and H2 are stored.

The CPU 11 is a processing device (processor), in which a control unit (control circuit), an arithmetic unit (arithmetic circuit), a cache memory (register group), and the like are integrated, and performs various kinds of control and operations. The CPU 11 implements various functions by running the OS and programs stored in the memory 12.

Figure 2:
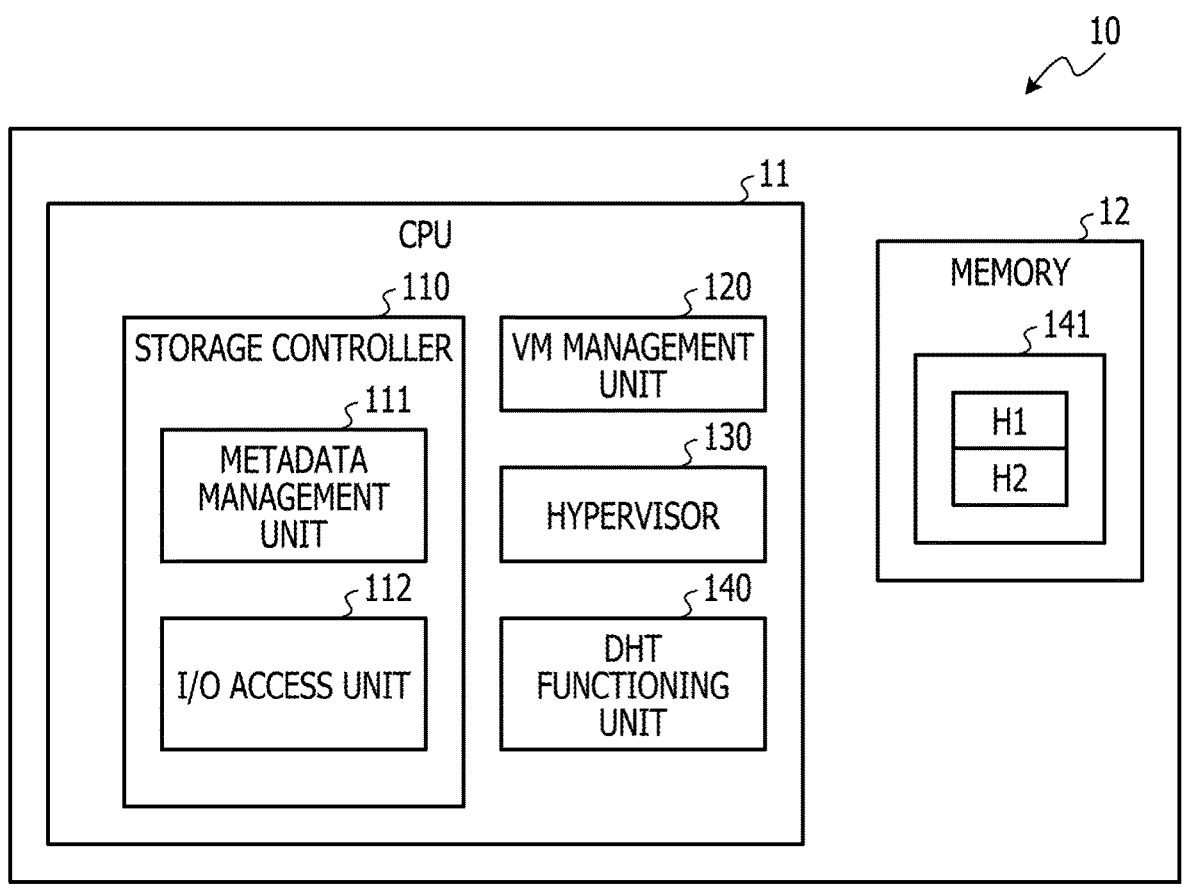
FIG. 2 is a diagram illustrating an example of a functional configuration of a node in a storage system, according to an embodiment.

FIG. 2 is a diagram illustrating an example of a functional configuration of the node 10 in the storage system 1, according to an embodiment.

In each node 10 included in the storage system 1, the CPU 11 runs a control program, thereby implementing functions of a hypervisor 130, a distributed hash table (DHT) functioning unit 140, a storage controller 110, and a VM management unit 120 as illustrated in FIG. 2.

A program (control program) for implementing functions of the hypervisor 130, the DHT functioning unit 140, the storage controller 110, and the VM management unit 120 is provided in a form in which the program is recorded on a computer-readable recording medium, for example, a flexible disk, a compact disk (CD) such as a CD-ROM, a CD-recordable (R), CD-read/write (RW), or the like, a digital versatile disk (DVD) such as a DVD-ROM, a DVD-RAM, a DVD-R, a DVD+R, a DVD-RW, a DVD+RW, a hard disk (HD)-DVD, or the like, Blue-ray Disc (registered trademark), a magnetic disk, an optical disk, a magneto-optical disk, or the like. The computer reads the program from the recording medium and transfers and stores the program in an internal storage device or an external storage device to use the program. The program may be recorded, for example, in a storage device (recording medium) such as a magnetic disk, an optical disk, a magneto-optical disk, or the like and be provided from the storage device to a computer over a communication path.

At the time of implementation of functions of the hypervisor 130, the DHT functioning unit 140, the storage controller 110, and the VM management unit 120, the program stored in an internal storage device, which is the memory 12 in the present embodiment, is executed by a microprocessor, which is the CPU 11 in the present embodiment, of a computer. At this point, a computer may read and execute the program recorded on a recording medium.

The DHT functioning unit 140 achieves functions of a DHT. A DHT projects some key (bit sequence) onto one point in logical space by a hash function or any linearization function and associates the projected point with a value. In the storage system 1, the DHT uses two hash functions H1 and H2. The functions of the DHT are known and detailed description thereof is omitted.

The hypervisor 130 is a control program for implementing the VM 2. The hypervisor 130, for example, creates and activates one or more VMs 2 on the node 10 on which the hypervisor 130 itself runs.

The VM 2 is a virtual computer created on the hypervisor 130. Each VM 2, like a computer implemented by physical hardware, uses a BIOS, a CPU, a memory, a disk, and a peripheral device such as a keyboard, a mouse, or a CD-ROM drive and performs various processes. For example, the VM 2 runs various OSs (guest OSs) or application programs that run In the guest OSs.

The VM management unit 120 determines the node 10 where the VM 2 created by the hypervisor 130 is to be placed. At the time of creation of the VM 2, for example, the VM management unit 120 determines the node 10 where the VM 2 is to be placed, by applying a LUN corresponding to the VM 2, as a key, to the hash function H1, that is, a first arithmetic expression. For example, the VM management unit 120 calculates the machine ID of the node 10 by applying a LUN to the hash function H1.

For example, when the hash function H1 is a consistent hash, assuming that LUN="6", applying the LUN to the hash function H1 yields 6 mod 3=0. In this case, the VM management unit 120 determines, or selects, the node 10 of the machine number "0" as the node 10 where LUN="6" is to be created.

Accordingly, the VM management unit 120 functions as a first determining unit that determines, out of the plurality of nodes 10, a location where the VM 2 is to be placed (hereinafter the location may be referred to as a placement location).

The hash function H1 is not limited to a consistent hash and may be modified as appropriate.

Hereinafter, a process performed by the VM management unit 120 may be referred to as a VM management process.

The storage controller 110 manages the storage device 13 included in each node 10 of the storage system 1. For example, the storage controller 110 uses respective storage areas of a plurality of storage devices 13 included in each node 10 of the storage system 1 to compose a single logical volume.

The storage controller 110 manages the storage devices 13 included in each node 10 of the storage system 1. For example, the storage controller 110 uses respective storage areas of a plurality of storage devices 13 included in each node 10 of the storage system 1 to compose one or more logical volumes.

Data, for example, created by the VM 2 is stored in the storage device 13 of any node 10 by the storage controller 110. Hereinafter, data that is created by the VM 2 and is stored in the storage device 13 of any node 10 may be referred to as data to be processed.

As illustrated in FIG. 2, the storage controller 110 includes the metadata management unit 111 and the I/O access unit 112.

The metadata management unit 111 determines and manages a location where metadata for data to be processed is to be saved (stored) (hereinafter the location may be referred to as a save location (storage location)).

Figure 3:
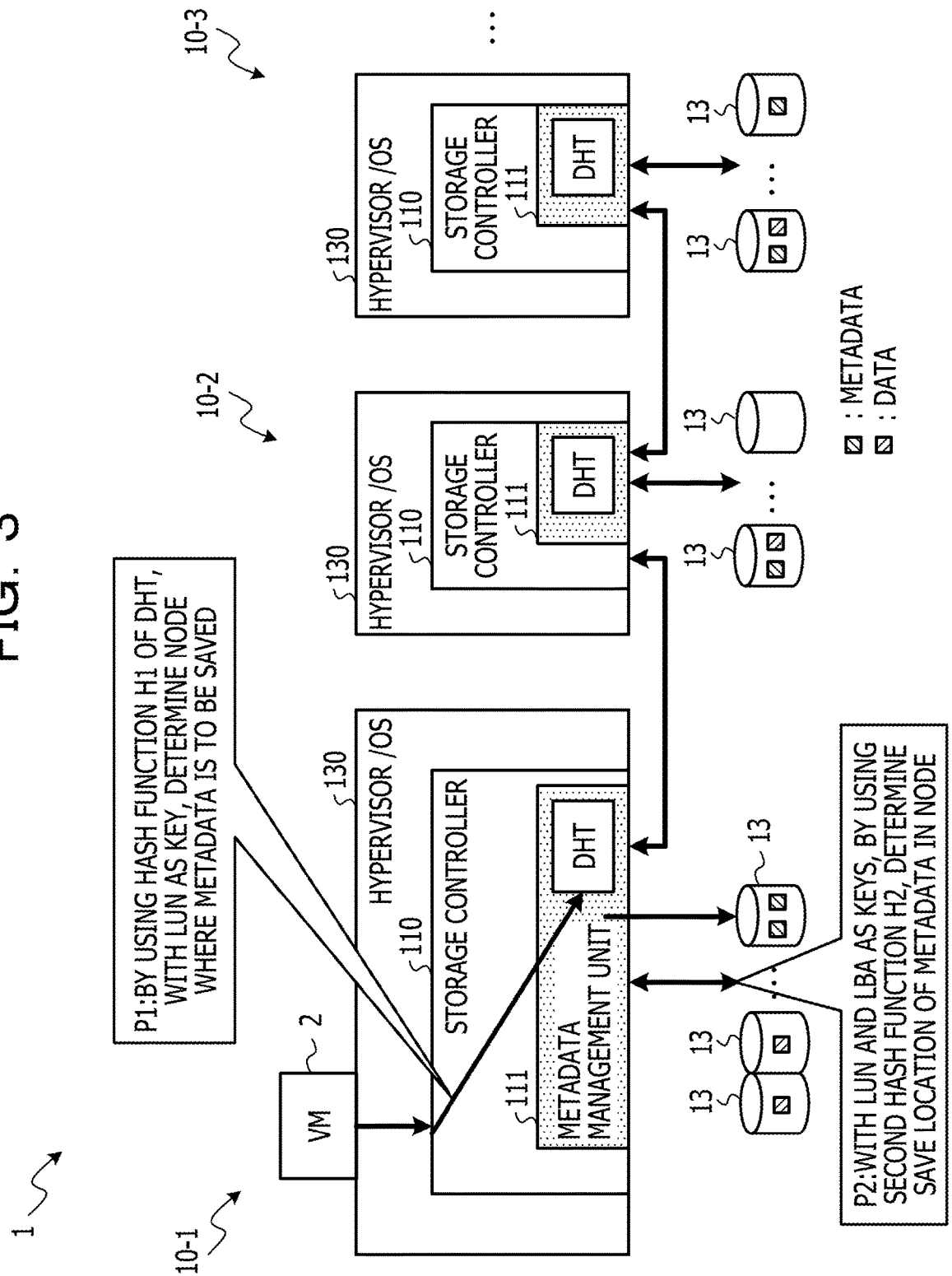
FIG. 3 is a diagram illustrating an example of a method for managing metadata by a metadata management unit in a storage system, according to an embodiment.
Figure 4:
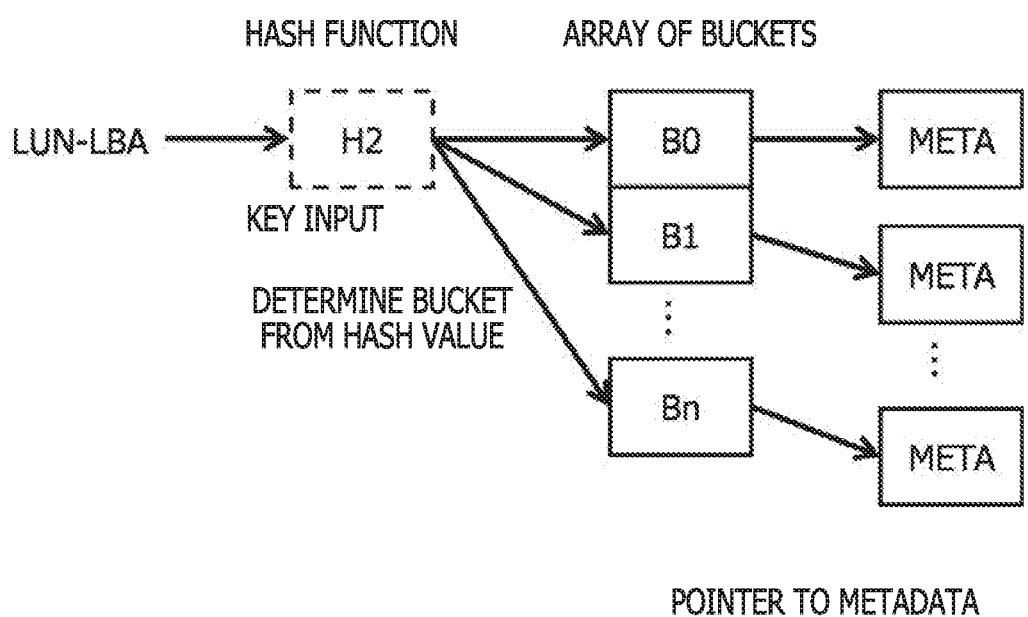
FIG. 4 is a diagram illustrating an example of a method for managing metadata by a metadata management unit in a storage system, according to an embodiment.

FIG. 3 and FIG. 4 are diagrams each illustrating an example of a method for managing metadata performed by the metadata management unit 111 in the storage system 1, according to an embodiment. FIG. 3 is a diagram illustrating a method by which the metadata management unit 111 determines the node 10 where metadata is to be saved, and FIG. 4 is a diagram illustrating a method by which the metadata management unit 111 determines a location where metadata is to be saved.

In FIG. 3, a process in which the metadata management unit 111 of the node 10-1 determines a location for storage of metadata (a location where metadata is to be saved).

The metadata management unit 111 manages metadata by using a two-level hashing method that uses two hash functions H1 and H2.

For example, the metadata management unit 111 applies, to the hash function H1, that is, the first arithmetic expression used for determining the placement location of the VM 2, the same key (LUN) as that used for determining the placement location of the VM 2 (the first-level hash), thereby determining the node 10 where metadata for the VM 2 is to be saved (refer to reference "P1" in FIG. 3).

Thereby, the node 10 where metadata is to be stored is the same as the placement location of the VM 2 that uses the metadata.

Thus, the metadata management unit 111 functions as a second determination unit that determines that the storage location of metadata (management information) for data to be processed that is to be accessed from the VM 2 is, among the plurality of nodes 10, the node 10 that is identical to that of the VM 2.

As described above, the hash function H1 is used for determining the node 10 where the VM 2 is to be placed, which is performed by the VM management unit 120, and for determining the node 10 where metadata is to be stored, and therefore the hash function H1 may be referred to as a shared hash function.

Thereafter, the metadata management unit 111 applies the LUN and the LBA of data to be processed, as keys, to the hash function H2, that is, a second arithmetic expression (the second-level hash), thereby determining a location for storage (save location) of metadata of the data to be processed in the node 10 where the metadata is to be saved (refer to reference "P2" in FIG. 3).

FIG. 4 illustrates a process of determining buckets B0 to Bn indicating storage locations of metadata (Meta) by inputting, as keys, the LUN and the LBA of data to be processed to the hash function H2.

In the buckets B0 to Bn, pointers for accessing metadata may be set. Alternatively, for example, a value, such as a physical block address (PBA), representing a location where metadata is saved may be set.

In the storage controller 110, a hash value is calculated by using, as keys, the LUN and the LBA. By using the calculated hash value as an index of array, a bucket is determined.

The metadata management unit 111 stores metadata at the determined storage location. That is, the metadata management unit 111 functions also as a storage processing unit that stores metadata in the node 10 determined as described above.

The metadata management unit 111 manages metadata correspondence information (not illustrated) in which the locations for storage of metadata are associated with the LUN and the LBA.

When a write access request is made from the VM 2, the metadata management unit 111 determines a location where metadata is to be saved, by using the two-level hashing described above, and saves the metadata at the determined location. The metadata management unit 111 registers the location for storage of metadata and the LUN and the LBA in association with each other in the metadata correspondence information mentioned above, in a hash table (metadata correspondence information).

When a read request is made from the VM 2, the metadata management unit 111 acquires the location for storage of metadata by referencing metadata correspondence information in accordance with the LUN and the LBA related to the read request.

The I/O access unit 112 reads data (data to be processed) from the storage device 13 or writes data (data to be processed) to the storage device 13 in accordance with an I/O request from the VM 2.

In order to access data to be processed in the storage device 13, the I/O access unit 112 acquires metadata for the data to be processed. The I/O access unit 112 acquires save location information of data to be processed included in the acquired metadata.

In the metadata, for example, the machine ID of the node 10 where data to be processed is saved, and the PBA are included as save location information of the data to be processed. When data to be processed is in a storage area of cache memory, the address in the cache memory is included as storage location information of the data to be processed.

In the metadata, information on whether data is compressed, whether deduplication is used, and the like is included as information indicating the state of the data to be processed.

The I/O access unit 112 becomes aware of the location for storage of metadata of data to be processed and acquires the metadata, for example, by referencing metadata correspondence information in accordance with the LUN and the LBA. Based on save location information included in the acquired metadata, the data to be processed is read.

The I/O access unit 112 accesses data to be processed by using the save location information of the data to be processed acquired from the metadata and performs processing such as reading and writing the data to be processed.

The I/O access unit 112 may calculate the machine ID of the node 10 that is the location where metadata of data to be processed is saved, by applying the LUN of the data to be processed, as a key, to the hash function H1 instead of by referencing metadata correspondence information.

In the node 10 that is the location where metadata is saved, the I/O access unit 112 may determine a bucket indicating the storage location of the metadata by applying the LUN and the LBA of data to be processed, as keys, to the hash function H2.

The I/O access unit 112 references the determined packet value to access metadata and acquires, from the metadata, save location information (the machine ID of the node 10 where data to be processed is saved, the PBA, and the like) of the data to be processed. The I/O access unit 112 may access the data to be processed by referencing the acquired save location information.

(B) Operations

Initialization Process

Figure 5:
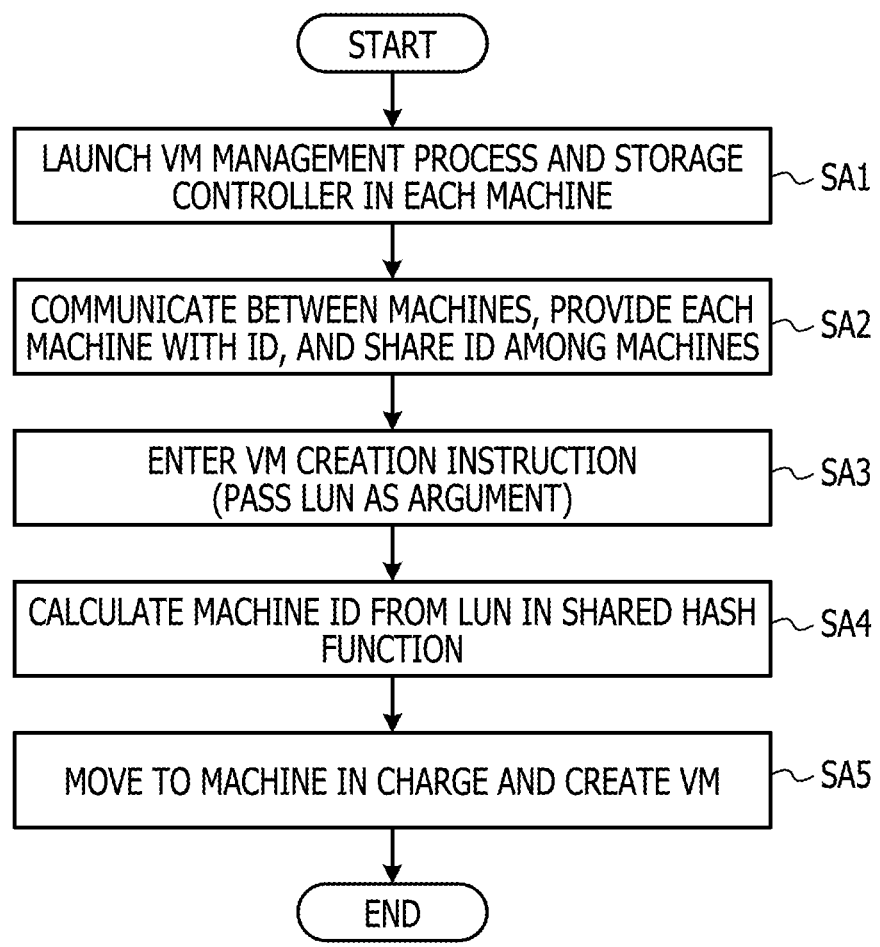
FIG. 5 is a flowchart illustrating an example of an initialization process in a storage system, according to an embodiment.
Figure 6:
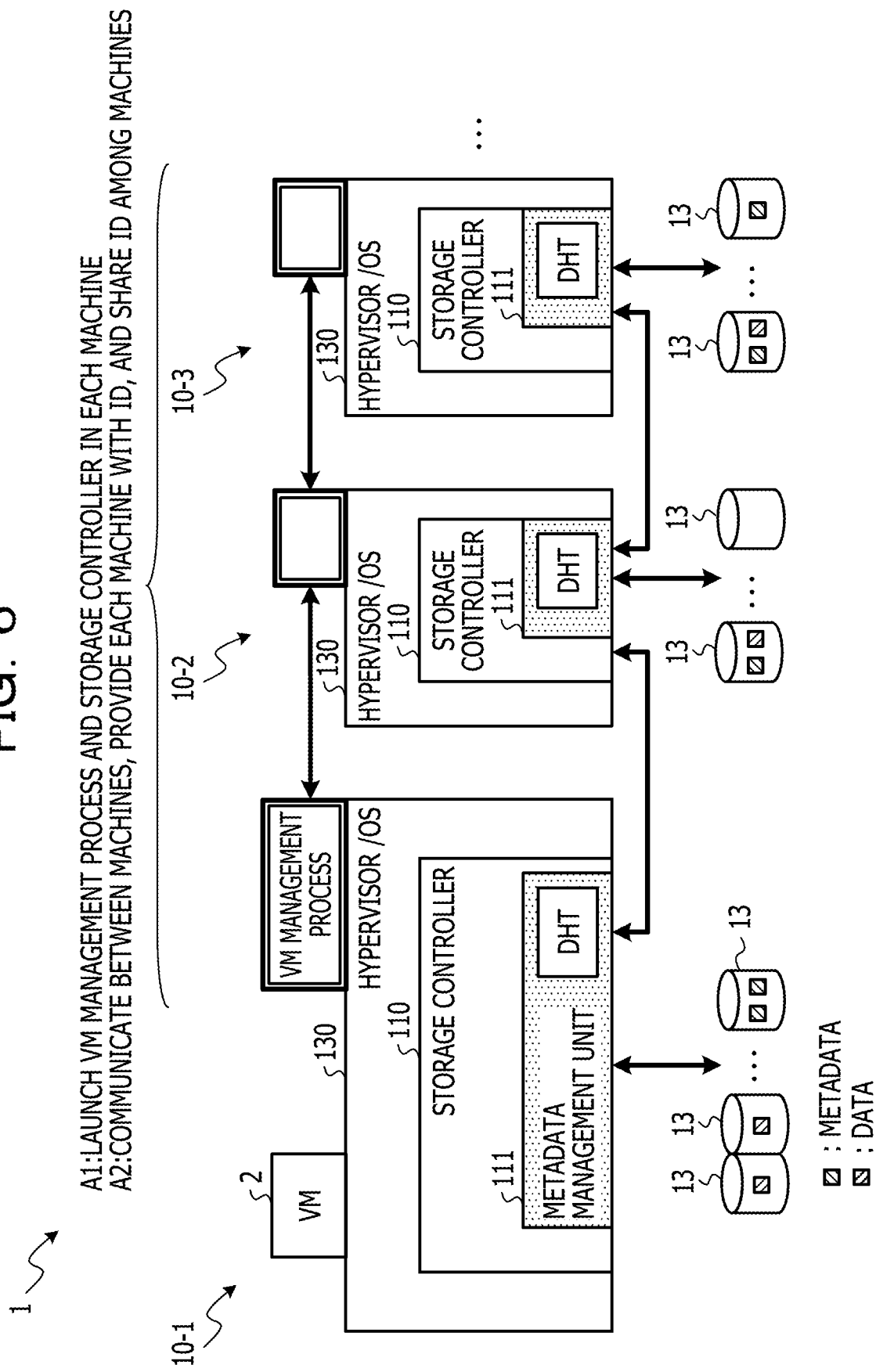
FIG. 6 is a diagram illustrating an example of an initialization process in a storage system, according to an embodiment.

Initially, an example of an initialization process in the storage system 1, according to an embodiment, configured as described above will be described with reference to a flowchart (SA1 to SA5) illustrated in FIG. 5 as well as with reference to FIG. 6. FIG. 6 is a diagram illustrating an initialization process of the storage system 1.

For example, at the timing of initial startup or the like of the storage system 1 when the storage system 1 is installed, the storage system 1 is initialized. At the time of power-on of the storage system 1, the initialization process may be performed.

In SA1, for example, a system administrator launches a VM management process by causing functions of the VM management unit 120 to be performed in each node 10, and launches the storage controller 110 and causes the storage controller 110 to execute the VM management process (refer to reference "A1" in FIG. 6).

In SA2, each of the nodes 10 communicates with each other, and a machine ID unique to each node 10 is set for the respective node 10. The machine ID set for each node 10 is shared in such a way that the nodes 10 notify each other of the respective machine IDs (refer to reference "A2" in FIG. 6). The machine IDs may be set by a known method and description thereof is omitted.

In SA3, for example, the system administrator enters an instruction for creating a VM. At this point, the system administrator enters the LUN of a logical volume associated with the VM. The entered LUN is passed as an argument to the VM management unit 120 (VM management process) of the node 10.

In SA4, the VM management unit 120 applies the LUN entered to the hash function H1 in SA3, thereby calculating the machine ID of the node 10 that is a placement location of the VM 2 to be newly created.

In SA5, the process moves to the node 10 of the calculated machine ID. In the node 10 to which the process has moved, the VM management unit 120 creates the VM 2 by using the functions of the hypervisor 130, and the process terminates.

VM Creation Process

An example of a process at the time of creating a VM in the storage system 1, according to an embodiment, will now be described with reference to FIG. 7.

Figure 7:
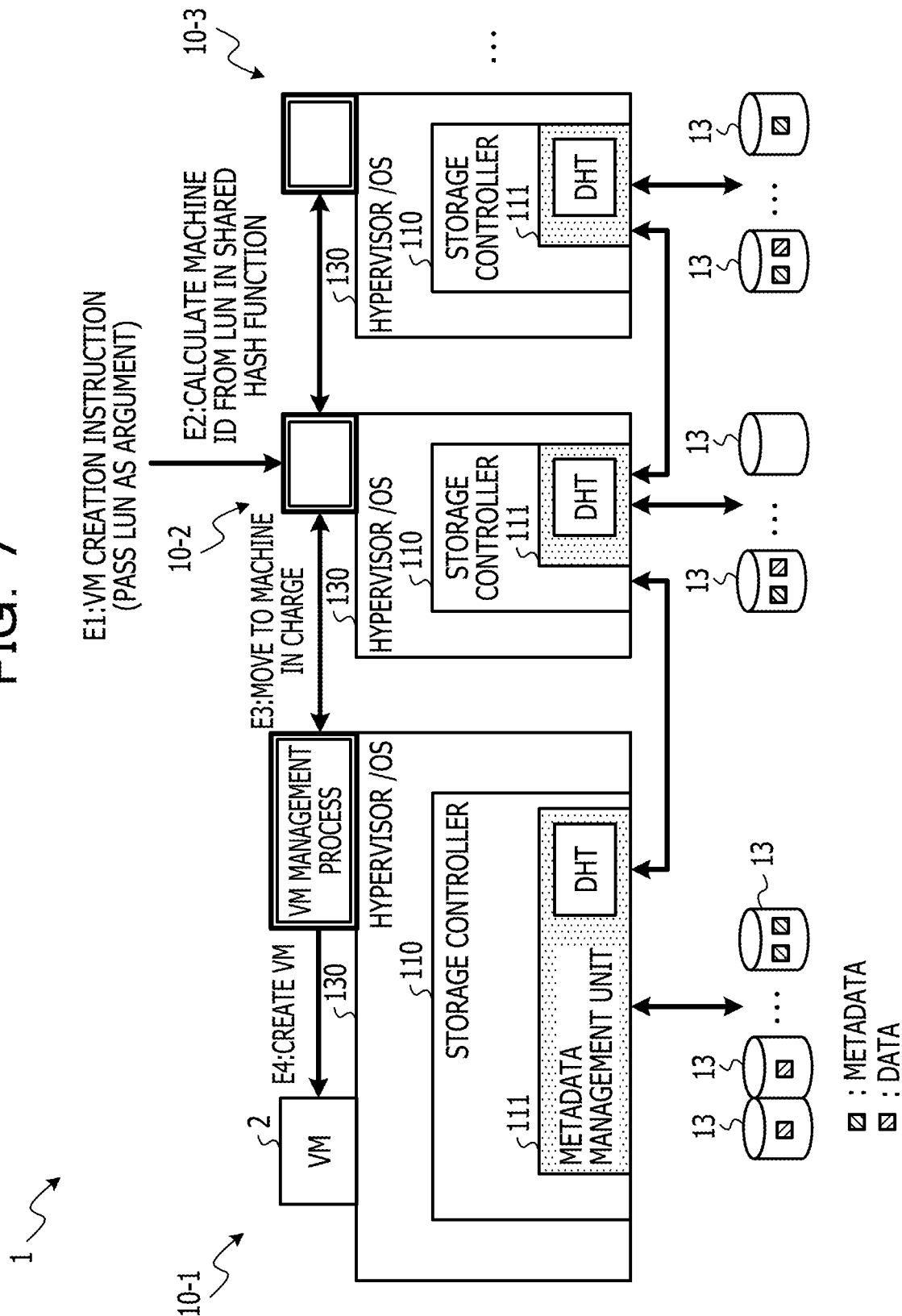
FIG. 7 is a diagram illustrating an example of processing during VM creation in a storage system, according to an embodiment.

The system administrator or the like enters an instruction for creating a VM (refer to reference "E1" in FIG. 7). At this point, the system administrator enters the LUN of a logical volume corresponding to the VM. The entered LUN is passed as an argument to the VM management unit 120 (VM management process) of the node 10.

The VM management unit 120 applies the entered LUN to the hash function H1, thereby calculating the machine ID of the node 10 that is a placement location of the VM 2 to be newly created (refer to reference "E2" in FIG. 7).

The process moves to the node 10 with the calculated machine ID (refer to reference "E3" in FIG. 7). In the node 10 to which the process has moved, the VM management unit 120 creates the VM 2 by using the functions of the hypervisor 130 (refer to reference "E4" in FIG. 7).

Read/Write Process

Figure 8:
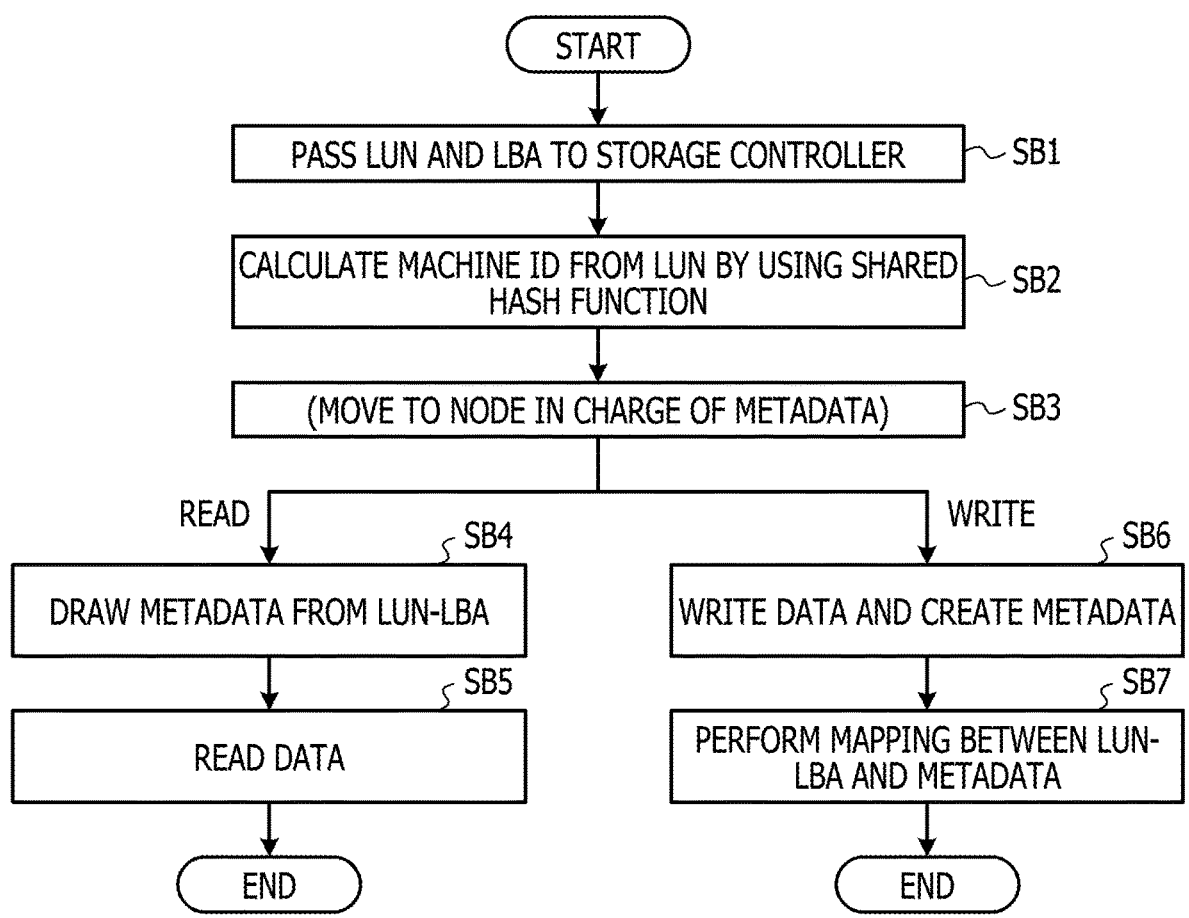
FIG. 8 is a flowchart illustrating an example of a read/write process in a storage system, according to an embodiment.
Figure 9:
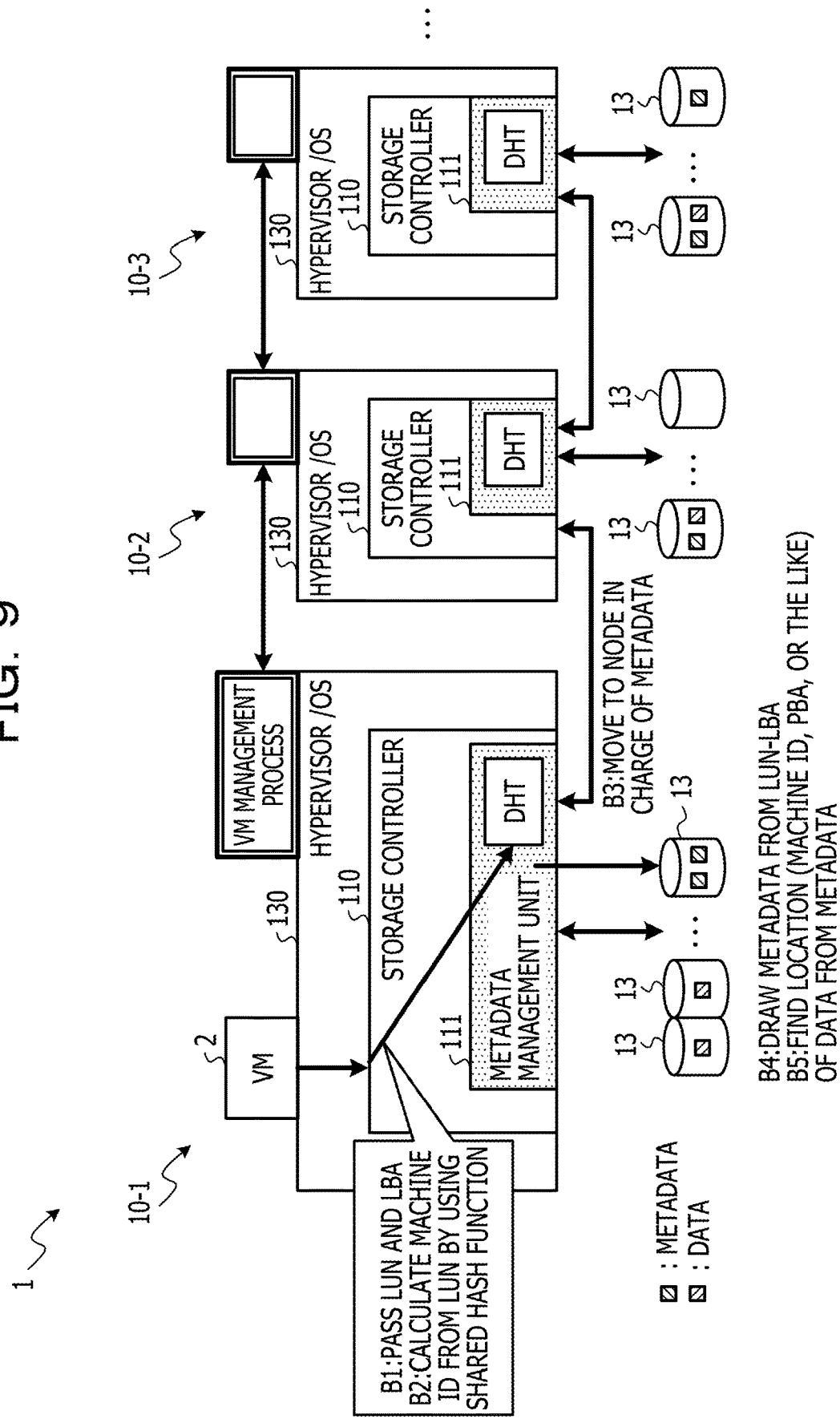
FIG. 9 is a diagram illustrating an example of a read process in a storage system, according to an embodiment.
Figure 10:
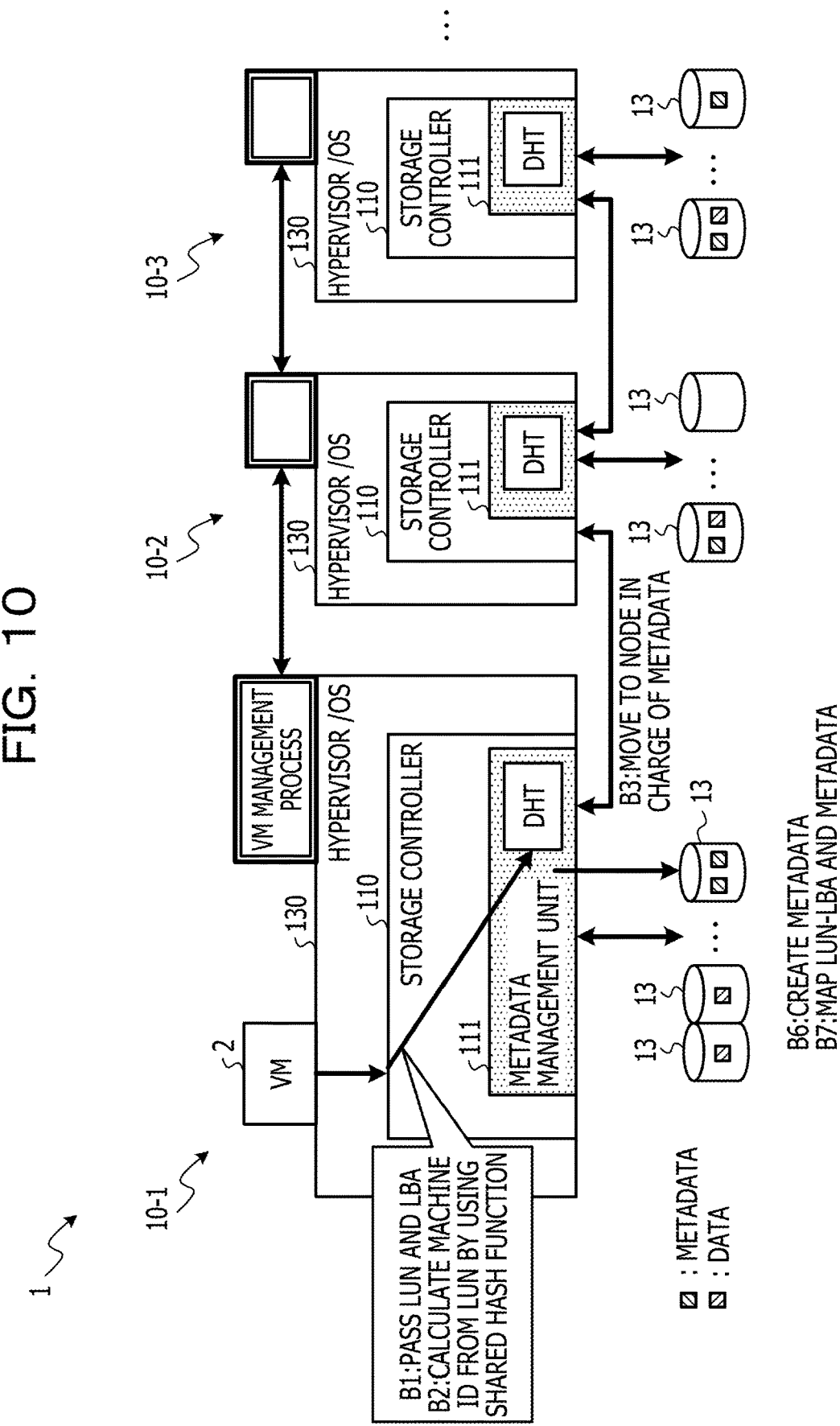
FIG. 10 is a diagram illustrating an example of a write process in a storage system, according to an embodiment.

An example of a read/write process in the storage system 1, according to an embodiment, will now be described with reference to a flowchart (SB1 to SB7) illustrated in FIG. 8 as well as with reference to FIG. 9 and FIG. 10. FIG. 9 is a diagram illustrating a read process in the storage system 1. FIG. 10 is a diagram illustrating a write process.

In SB1, the VM 2 passes the LUN and the LBA of data to be processed, as well as an I/O access request, to the storage controller 10 (refer to reference "B1" in FIG. 9 and FIG. 10).

In SB2, the I/O access unit 112 of the storage controller 110 applies the LUN of data to be processed to the shared hash function H1, thereby calculating the machine ID of the node 10 where the metadata of the data to be processed is saved (refer to reference "B2" in FIG. 9 and FIG. 10).

In SB3, the process moves to the node 10 of the calculated machine ID (refer to reference "B3" in FIG. 9 and FIG. 10).

If the I/O access request from the VM 2 is a read request, the process proceeds to SB4.

In SB4, in the node 10 to which the process has moved, the metadata management unit 111 refers to (draws) metadata correspondence information in accordance with the LUN and the LBA passed by the VM 2 in SB1, thereby acquiring the location for storage of metadata for the data to be processed (refer to reference "B4" in FIG. 9).

The I/O access unit 112 acquires metadata by accessing the acquired location for storage of metadata.

Thereafter, in SB5, the I/O access unit 112 acquires, from the metadata acquired in SB1, save location information (the machine ID of the node 10 where data to be processed is saved, the PBA, and the like) of the data to be processed. The I/O access unit 112 references the acquired save location information and reads the data to be processed (refer to reference "B5" in FIG. 9), and the process terminates.

If, after completion of SB3, the I/O access request from the VM 2 is a write request, the process proceeds to SB6.

In SB6, in the node 10 to which the process has moved, the I/O access unit 112 writes data at a location identified by the LUN and the LBA acquired in SB1 and creates metadata of the written data (data to be processed) (refer to reference "B6" in FIG. 10).

In SB7, the I/O access unit 112 applies the LUN and the LBA passed by the VM 2 in SB1 to the hash function H2, thereby determining a bucket indicating a storage location of the metadata.

The metadata management unit 111 stores the metadata at a location (a location where the metadata is to be saved) identified by the determined bucket. The metadata management unit 111 registers the location for storage of metadata and the LUN and the LBA in association with each other in the metadata correspondence information described above (mapping) (refer to reference "B7" in FIG. 10), and the process terminates.

Node Reduction Process

Figure 11:
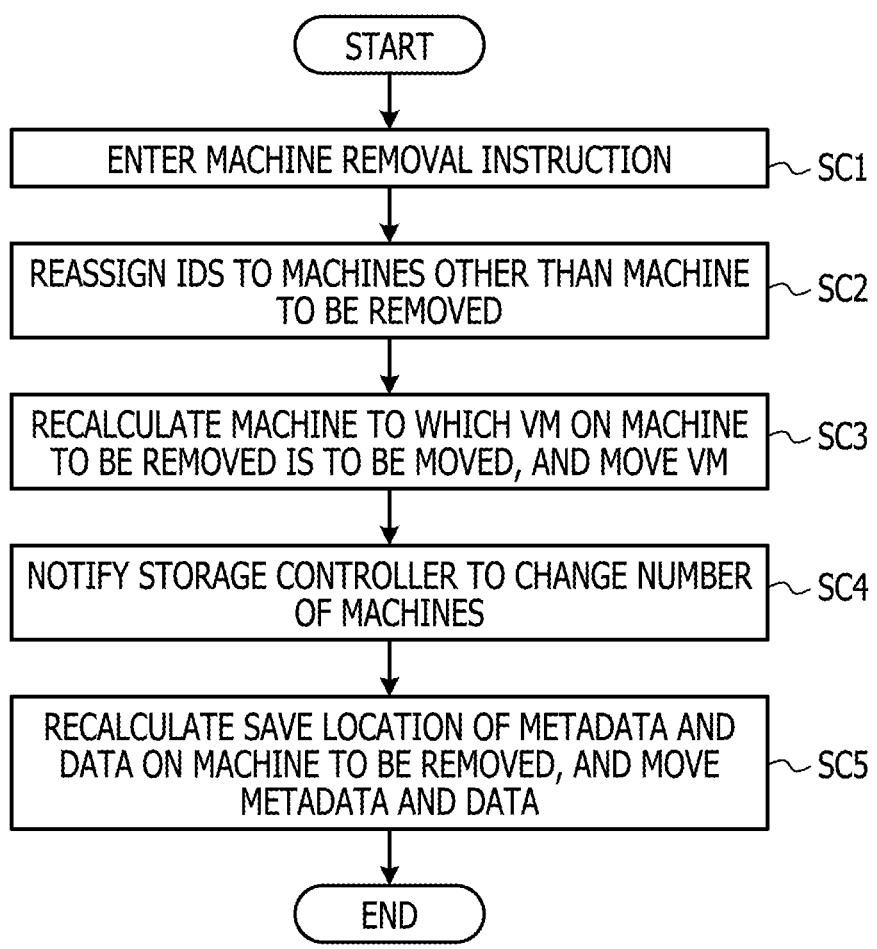
FIG. 11 is a flowchart illustrating an example of a process at the time of reducing a node in a storage system, according to an embodiment.
Figure 12:
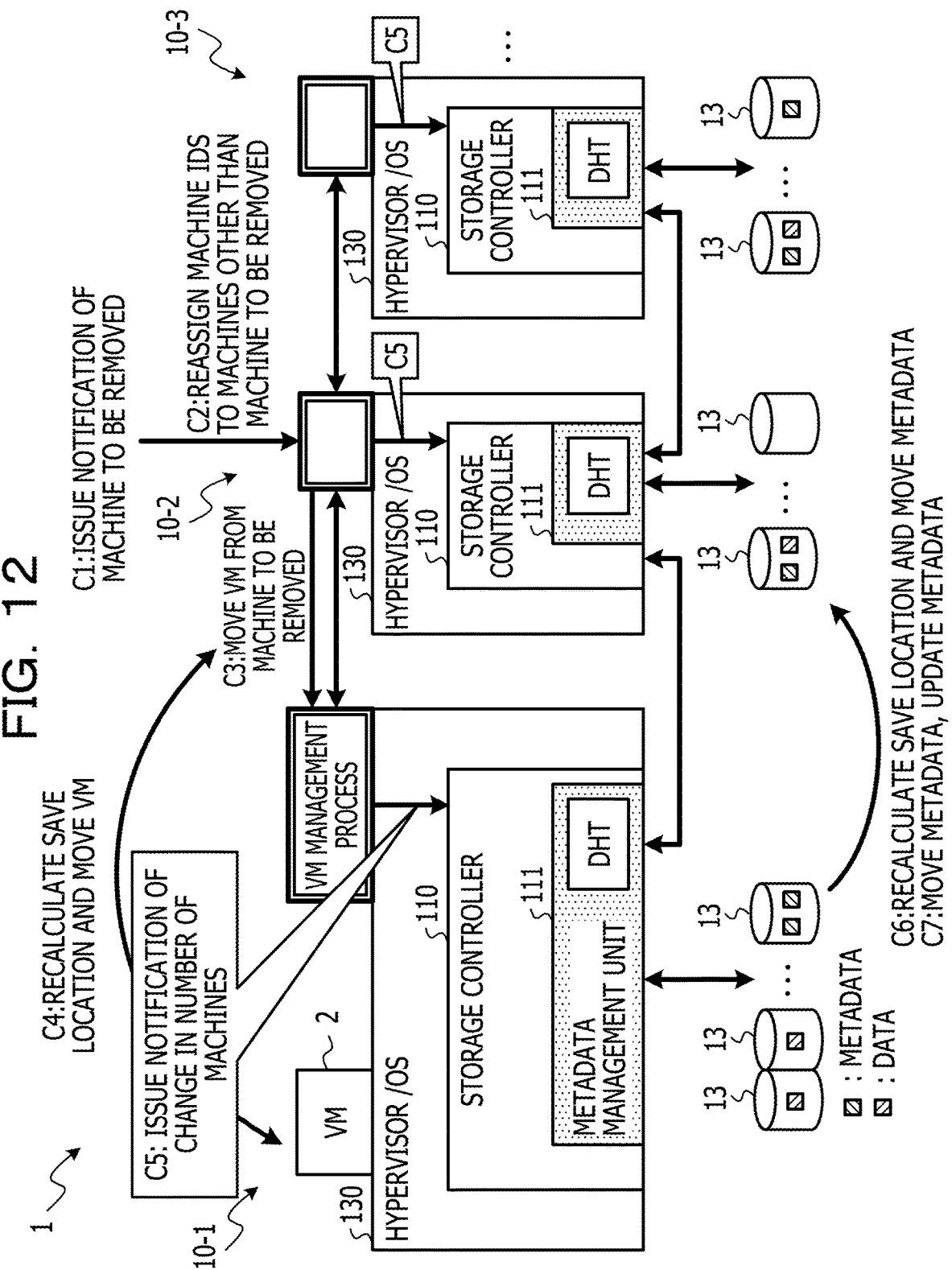
FIG. 12 is a diagram illustrating an example of a process at the time of reducing a node in a storage system, according to an embodiment.

An example of a process at the time of reducing the node 10 in the storage system 1, according to an embodiment, will now be described with reference to a flowchart (SC1 to SC5) illustrated in FIG. 11 as well as with reference to FIG. 12. FIG. 12 is a diagram illustrating a process at the time of reducing the node 10 in the storage system 1.

Reduction of the node 10 (reduction in the number of nodes) is performed, for example, in the case of stopping the node 10 for the maintenance purpose or the like. In the case of performing such reduction of the node 10, a process of moving the VM 2 on the node 10 to be stopped to another node 10 is performed.

In SC1, a system administrator or the like enters an instruction that the node 10 be removed (refer to reference "C1" in FIG. 12). In the entered instruction, information (for example, a machine ID) identifying the node 10 to be removed is included. In the example illustrated in FIG. 12, it is assumed that the node 10-1 (with a machine ID "0") is the node 10 to be removed.

In SC2, machine IDs are reassigned among all the nodes 10 (the node 10-2 and the node 10-3 in the example illustrated in FIG. 12) other than the node 10 to be removed, by the respective VM management units 120 (refer to reference "C2" in FIG. 12). Thereby, a machine ID "1" and a machine ID "2" are reassigned to the node 10-2 and the node 10-3, respectively.

Thereafter, the process moves to the node 10-1 to be removed (refer to reference "C3" in FIG. 12).

In SC3, in the node 10-1 to be removed, the VM management unit 120 calculates (recalculates) the node 10 to which the VM 2 running on the current node (node to be removed) 10-1 is to be moved.

For example, the VM management unit 120 applies the LUN corresponding to the VM 2 to be moved, as a key, to the hash function H1, thereby determining the node 10 where the VM 2 is to be placed, that is, the node 10 to which the VM 2 is to be moved.

The VM management unit 120 moves the VM 2 to be moved, to the node 10 (the node 10-2 in the example illustrated in FIG. 12) determined by recalculation (refer to reference "C4" in FIG. 12).

In SC4, the VM management unit 120 of the node 10-1 to be removed notifies the storage controller 110 that the number of machines (the number of nodes 10) has changed (refer to reference C5 in FIG. 12). The VM management unit 120 of the node 10-1 to be removed also notifies the VM management units 120 of the other nodes 10 of the change in the number of machines. In each node 10, the VM management unit 120 notifies the storage controller 110 of that node 10 of the change in the number of machines (refer to reference C5 in FIG. 12).

In SC5, the storage controller 110 (the metadata management unit 111) of the node 10-1 to be removed calculates (recalculates) a location where metadata on the node 10-1 to be removed is to be saved, and moves the metadata to the node 10 that is the calculated location to which the metadata is to be moved (refer to reference "C6" in FIG. 12).

The location where metadata is to be moved is managed by using the two-level hashing method that uses the two hash functions H1 and H2 as mentioned above.

For example, the node 10 where metadata for the VM 2 is to be saved is determined by applying, to the hush function H1 used for determining a placement location of the VM 2, the same key (LUN) as that used for determining the placement location of the VM 2 (the first-level hash).

For example, when the hash function H1 is a consistent hash, in the case of LUN="6", applying the LUN to the hash function H1 yields 6 mod 2=0. In this case, the VM management unit 120 determines, or selects, the node 10 of the machine number "0" as the node 10 where metadata corresponding to the LUN="6" is to be saved.

Thereafter, the metadata management unit 111 applies the LUN and the LBA of data to be processed, as keys, to the hash function H2 (the second-level hash), thereby determining a location for storage of metadata of the data to be processed, that is, a location where the metadata is to be moved, in the node 10 where the metadata is to be saved.

Thereafter, the storage controller 110 of the node 10-1 to be removed calculates (recalculates) a location where data (data to be processed) on the node 10-1 (the node to be removed) is to be saved. If the node 10 where data is to be saved is changed, the storage controller 110 moves the data to the node 10 that is the calculated location where the data is to be moved (refer to reference "C7" in FIG. 12). When data is moved, the metadata will be updated The node 10 where data (data to be processed) on the node 10-1 (the node to be removed) is to be saved, may be, for example, identical to the node 10 of the corresponding VM 2 and may be determined by using known various methods by the storage controller 110.

Thereafter, the process terminates.

Node Addition Process

Figure 13:
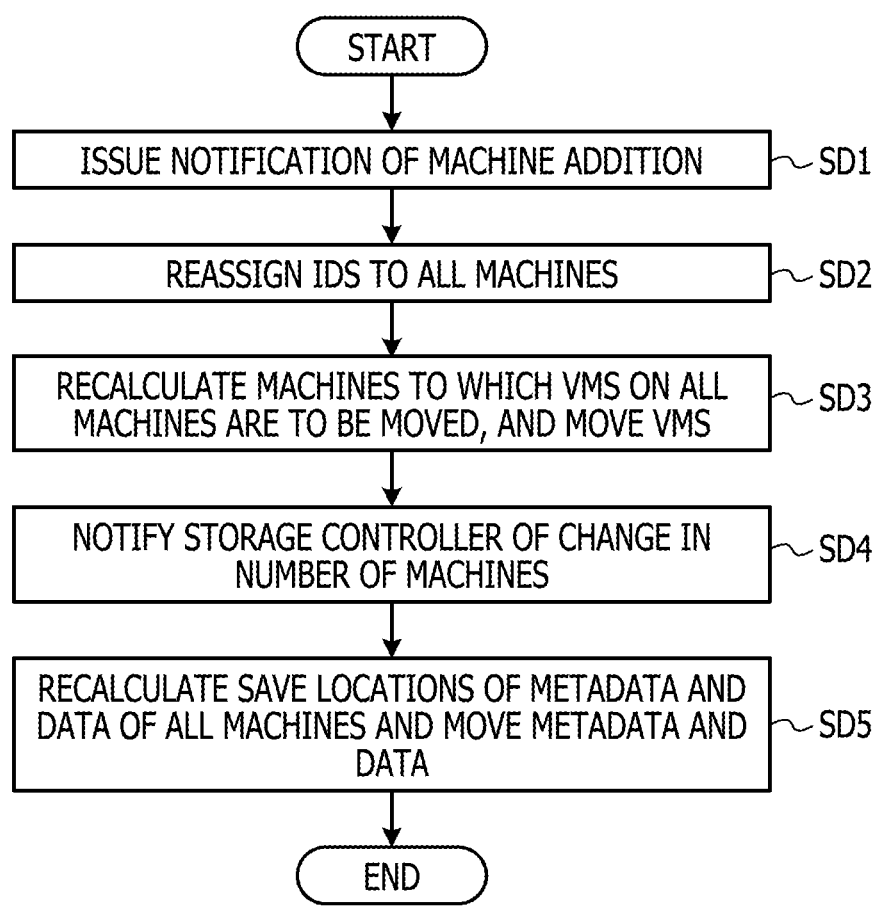
FIG. 13 is a flowchart illustrating an example of a process at the time of adding a node in a storage system, according to an embodiment.

An example of a process at the time of adding the node 10 in the storage system 1, according to an embodiment, will now be described with reference to a flowchart (SD1 to SD5) illustrated in FIG. 13 as well as with reference to FIG. 14.

Figure 14:
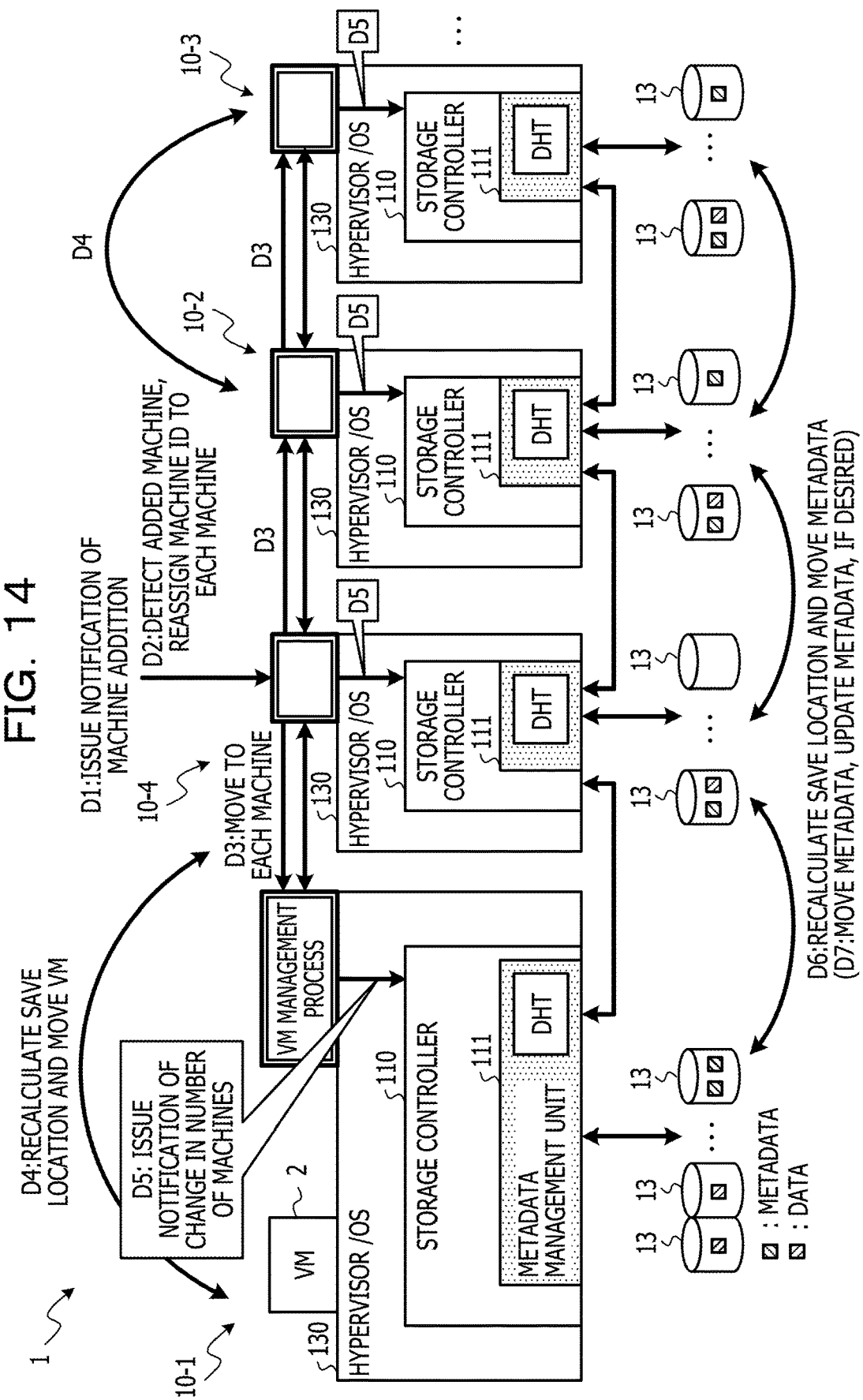
FIG. 14 is a diagram illustrating an example of a process at the time of adding a node in a storage system, according to an embodiment.

In SD1, a new node 10 is coupled to the storage system 1 and a system administrator or the like enters an instruction that the node 10 be added (refer to reference D1 in FIG. 14). In the example illustrated in FIG. 14, a node 10-4 is assumed to be a node 10 to be added (an added node or an added machine).

In SD2, the added node 10 is detected by each of the other nodes 10, and machine IDs are reassigned among all the nodes 10 including the added node 10 by the respective VM management units 120 (refer to reference D2 in FIG. 14). Thereby, for example, a machine ID "4" is assigned to the added node 10-4.

Thereafter, the process moves to each node 10 (refer to reference D3 in FIG. 14).

In SD3, in all of the nodes 10, the VM management unit 120 calculates (recalculates) the node 10 to which the VM 2 running on the node 10 in question is to be moved.

For example, the VM management unit 120 applies the LUN corresponding to the VM 2 to be moved, as a key, to the hash function H1, thereby determining the node 10 where the VM 2 is to be placed, that is, the node 10 to which the VM 2 is to be moved.

For example, when the hash function H1 is a consistent hash, in the case of LUN="6", applying the LUN to the hash function H1 yields 6 mod 4=2. In this case, the VM management unit 120 determines, or selects, the node 10 of the machine number "2" as the node 10 to which the VM 2 and the metadata corresponding to LUN="6" are to be moved.

The VM management unit 120 moves the VM 2 to be moved, to the node 10 determined by the recalculation (refer to reference "D4" in FIG. 14).

In SD4, the VM management unit 120 of each node 10 notifies the storage controller 110 that the number of machines (the number of the nodes 10) has changed (refer to reference "D5" in FIG. 14).

In SD5, the storage controller 110 (the metadata management unit 111) of each of all the nodes 10 in the storage system 1 calculates (recalculates) a location where metadata on the node 10 is to be saved. The storage controller 110 moves the metadata to the calculated node 10 to which the metadata is to be moved (refer to reference "D6" in FIG. 14).

The location to which metadata is to be moved is managed by using the two-level hashing method that uses two hash functions H1 and H2.

For example, the node 10 where metadata for the VM 2 is to be saved is determined by applying, to the hash function H1 used for determining a placement location of the VM 2, the same key (LUN) as that used for determining the placement location of the VM 2 (the first-level hash). Thereafter, the metadata management unit 111 applies the LUN and the LBA of data to be processed, as keys, to the hash function H2 (the second-level hash), thereby determining a location for storage of metadata of the data to be processed, that is, a location to which the metadata is to be moved, in the node 10 where the metadata is to be saved.

Thereafter, the storage controller 110 of each node 10 calculates (recalculates) a location where data (data to be processed) on the node 10 in question is to be saved. If there is a change in the node 10 where the data is to be saved, the storage controller 110 moves the data to the calculated node 10 to which the data is to be moved (refer to reference "D7" in FIG. 14). When data is moved, the metadata will be updated.

The node 10, determined by the storage controller 110, where data (data to be processed) on the node 10 of the storage controller is to be saved may be identical to that of the corresponding VM 2 and may be determined by using various known methods.

Thereafter, the process terminates.

(C) Effects

As described above, in the storage system 1 by way of example according to an embodiment, the metadata management unit 111 performs processing, such that the node 10 where metadata is to be saved is identical to the node 10 where the VM 2 that deals with the metadata is to be placed. This reduces the occurrences of network communication for accessing metadata. Thereby, no network resources are consumed for access to metadata and network overhead is minimized, and therefore I/O access performance improves.

Due to the load distribution effect of a DHT, the VMs 2 are distributed. This may have a secondary effect in that effective utilization of resources is possible.

(D) Others

The disclosed techniques are not limited to the foregoing embodiment and may be carried out with various modifications without departing from the spirit and scope of the disclosed embodiments.

For example, the number of the nodes 10 included in the storage system 1 is not limited to three. The number of the nodes 10 may be two or less or four or more and may be carried out with various modifications.

First Modification

In the foregoing embodiment, the metadata management unit 111 uses the LUN as a key to determine the node 10 where metadata is to be saved, but the key is not limited to this. For example, different identification information (ID) may be used as the key for determining the node 10 where metadata is to be saved.

As such an ID, it is desirable to use a unique value that uniquely identify the VM 2. For example, unique identification information is set in advance for each VM 2, and the set identification information may be used as an ID. An IP address set for each VM 2 may be used as an ID.

Furthermore, for example, in a system, such as a kernel-based virtual machine (KVM), in which a unique ID is assigned to a VM, the node 10 where metadata is to be saved may be determined by using, as a key, this ID of the VM.

By using, as a key, identification information set uniquely for each VM 2, it is ensured that metadata may be placed in the node 10 that is identical to the node of the VM 2 even when one VM 2 includes a plurality of LUNs.

Second Modification

In the foregoing embodiment, the metadata management unit 111 applies the LUN and the LBA of data to be processed, as keys, to the hash function H2, thereby determining, in the node 10 where metadata of data to be processed is saved, a location where the metadata for the data to be processed is to be stored, that is, a location to which the metadata is to be moved; however, embodiments are not limited to this.

Figure 15:
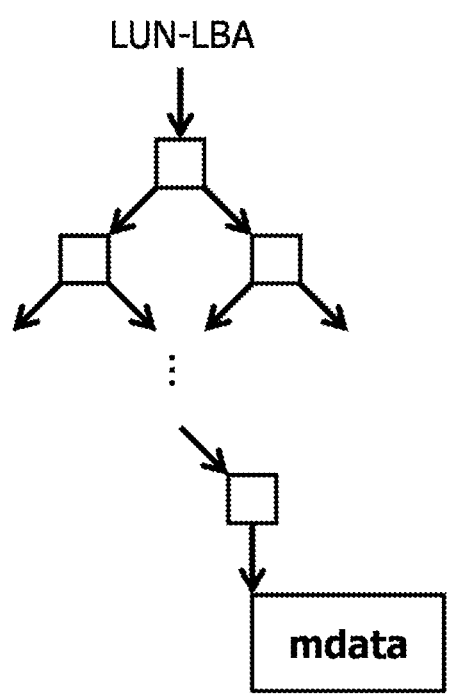
FIG. 15 is a diagram illustrating another example of association of an LUN and an LBA with location for storage of metadata in a storage system, according to an embodiment.
Figure 16:
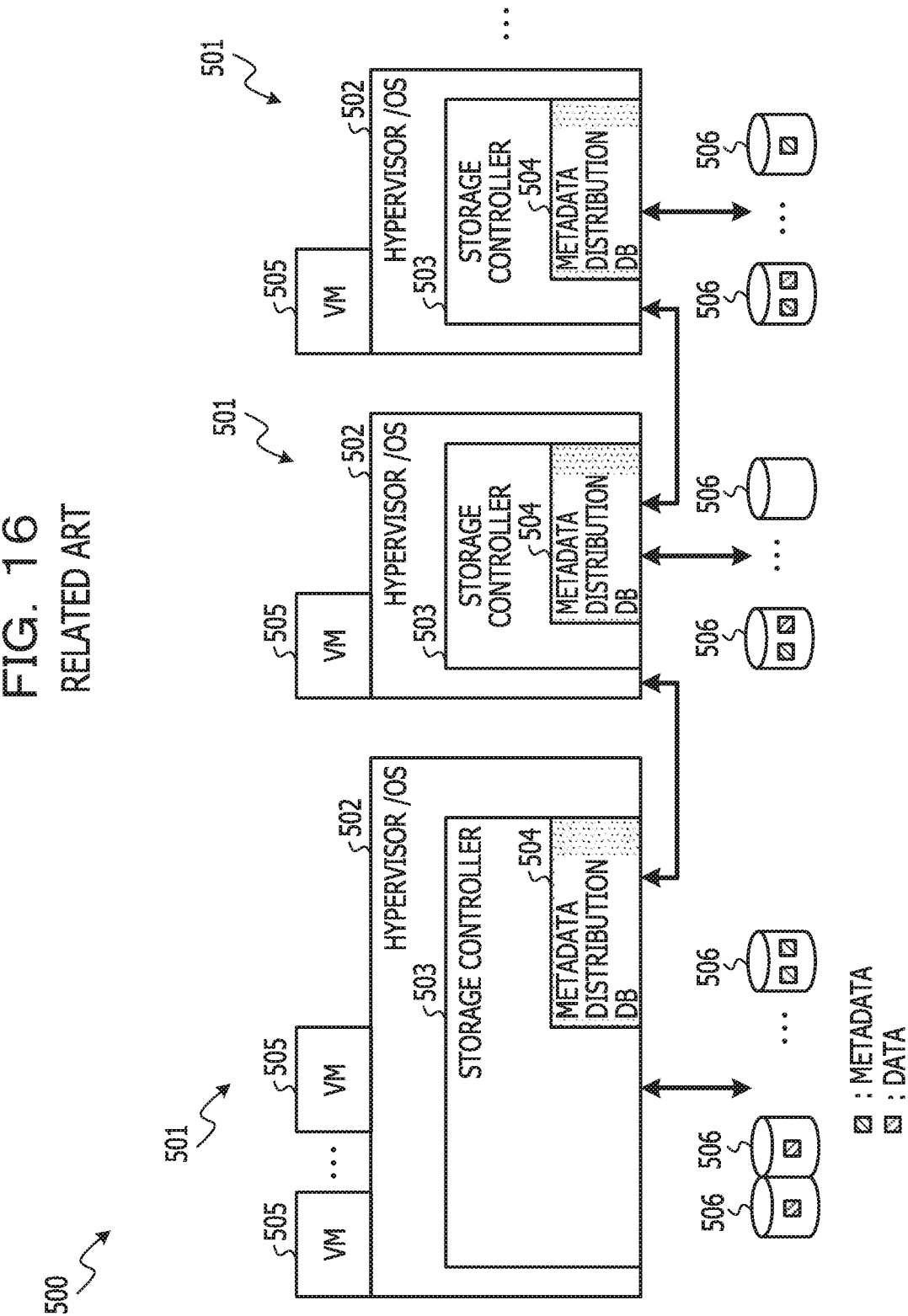
FIG. 16 is a diagram schematically illustrating a configuration of an existing HCI system.
Figure 17:
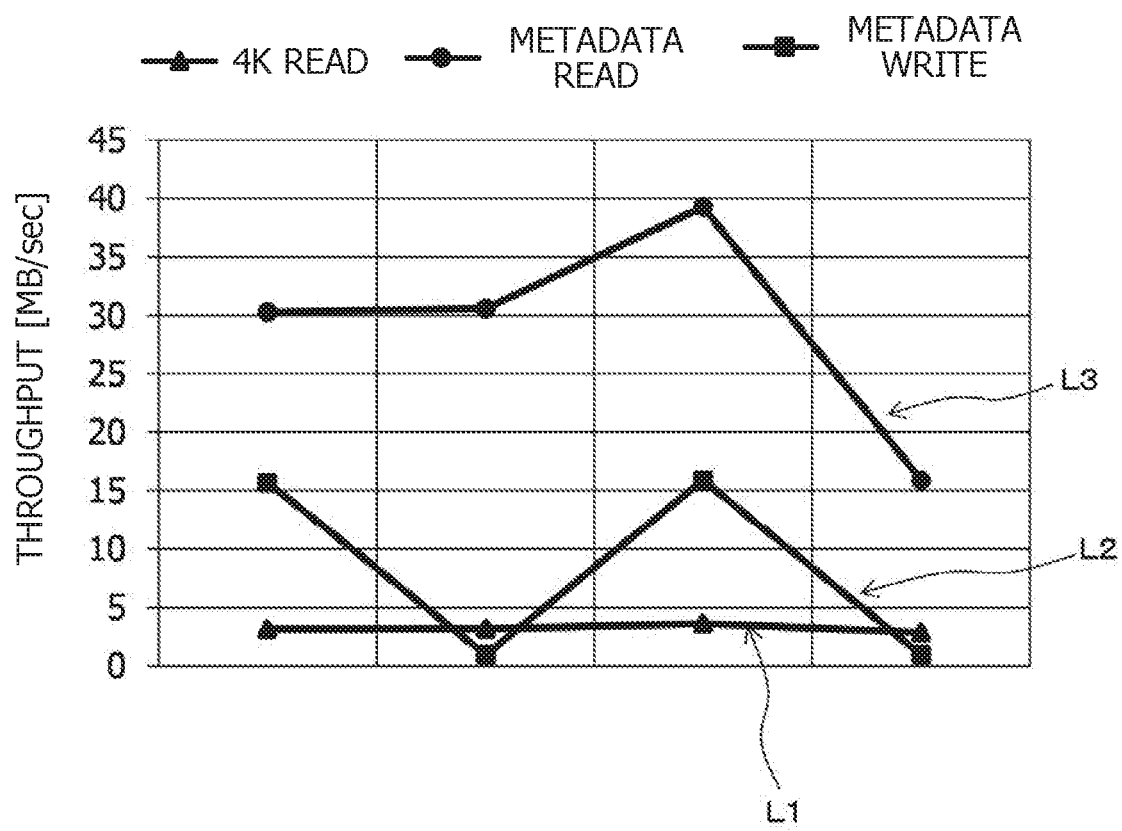
FIG. 17 is a diagram illustrating a state of network traffic in an existing HCI system.

FIG. 15 is a diagram illustrating an example of another association of the LUN and the LBA with metadata in the storage system 1, according to an embodiment.

In FIG. 15, a tree structure in which the LUN and the LBA are coupled to the location for storage of metadata (mdata) via one or more pointers is illustrated.

The metadata management unit 111 may store, in the memory 12 or the like, such a tree structure in which the LUN and the LBA are coupled to the location for storage of metadata via one or more pointers, and may acquire the metadata by tracking the tree structure in accordance with the LUN and the LBA. This enables the metadata management unit 111 to arrive at the location for storage of metadata in accordance with the LUN and the LBA without performing an operation using hash functions.

The disclosed embodiments are not limited to the embodiment described above and may be carried out with various modifications without departing from the spirit and scope of the disclosed embodiments.

The disclosed embodiments may be implemented and manufactured by a person skilled in the art through the above disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus configured to be coupled via a communication line to a plurality of nodes each having a storage device, the information processing apparatus comprising:

a memory; and a processor coupled to the memory and configured to:

determine, from among a plurality of nodes, a location where a virtual machine is to be placed by applying identification information corresponding to the virtual machine to an arithmetic expression, determine that a location where management information on data to be processed, the data to be accessed from the virtual machine, is to be stored is, among the plurality of nodes, a node that is identical to the location of the virtual machine, by applying identification information corresponding to the virtual machine to the arithmetic expression, and store the management information in the determined node.

2. The information processing apparatus according to claim 1, wherein the processor is configured to use a determination method that is identical to a method for determining the location where the virtual machine is to be placed, to determine the node of the location where the management information is to be stored.

3. The information processing apparatus according to claim 1, wherein the identification information is a logical unit number (LUN), the arithmetic expression is a hash function, and the processor is configured to determine a location where the virtual machine is to be placed, by applying the LUN as a key to the hash function.

4. The information processing apparatus according to claim 3, wherein the hash function is a consistent hash.

5. The information processing apparatus according to claim 1, wherein the management information is metadata.

6. An information processing method that is executed by a processor included in an information processing apparatus configured to be coupled via a communication line to a plurality of nodes each including a storage device, the information processing method comprising:

determining, from among the plurality of nodes, a location where a virtual machine is to be placed by applying identification information corresponding to the virtual machine to an arithmetic expression;

determining that a location where management information on data to be processed, the data to be accessed from the virtual machine, is, among the plurality of nodes, a node that is identical to the location of the virtual machine, by applying identification information corresponding to the virtual machine to the arithmetic expression, and storing the management information in the determined node.

7. The information processing method according to claim 6, wherein determining the node of the location where the management information is to be saved includes determining the node by using a determination method that is identical to the method for determining the location where the virtual machine is to be placed.

8. The information processing method according to claim 6, wherein the identification information is a logical unit number (LUN), the arithmetic expression is a hash function, and the determining a location where the virtual machine is to be placed includes determining a location where the virtual machine is to be placed, by applying the LUN as a key to the hash function.

9. The information processing method according to claim 8, wherein the hash function is a consistent hash.

10. The information processing method according to claim 6, wherein the management information is metadata.

11. A non-transitory computer-readable storage medium storing a program that causes a computer to execute a process, the computer being configured to be coupled via a communication line to a plurality of nodes each having a storage device, the process comprising:

determining, from among the plurality of nodes, a location where a virtual machine is to be placed by applying identification information corresponding to the virtual machine to an arithmetic expression, determining that a location where management information on data to be processed, the data to be accessed from the virtual machine, is, among the plurality of nodes, a node that is identical to the location of the virtual machine, by applying identification information corresponding to the virtual machine to the arithmetic expression, and storing the management information in the determined node.

* * * * *